US008096752B2

(12) United States Patent
Bathina et al.

(10) Patent No.: US 8,096,752 B2
(45) Date of Patent: Jan. 17, 2012

(54) METHOD AND APPARATUS FOR COOLING A TRANSITION PIECE

(75) Inventors: Mahesh Bathina, Andhra Pradesh (IN); Ramanand Singh, Uttar Pradesh (IN)

(73) Assignee: General Electric Company, Schenectady, NY (US)

( * ) Notice: Subject to any disclaimer, the term of this patent is extended or adjusted under 35 U.S.C. 154(b) by 520 days.

(21) Appl. No.: 12/349,221

(22) Filed: Jan. 6, 2009

(65) Prior Publication Data

US 2010/0172746 A1 Jul. 8, 2010

(51) Int. Cl.
*F01D 5/14* (2006.01)
*F03D 11/00* (2006.01)
*F04D 29/38* (2006.01)

(52) U.S. Cl. ............. 415/115; 415/116; 60/752; 60/753

(58) Field of Classification Search .................. 415/115, 415/116, 117; 60/752, 753
See application file for complete search history.

(56) References Cited

U.S. PATENT DOCUMENTS

| | | | | | |
|---|---|---|---|---|---|
| 3,742,706 | A | * | 7/1973 | Klompas | 415/115 |
| 5,181,379 | A | * | 1/1993 | Wakeman et al. | 60/766 |
| 5,363,654 | A | * | 11/1994 | Lee | 60/752 |
| 5,724,816 | A | * | 3/1998 | Ritter et al. | 60/752 |
| 6,103,081 | A | * | 8/2000 | Morris et al. | 204/451 |

* cited by examiner

*Primary Examiner* — David Nhu
(74) *Attorney, Agent, or Firm* — Cantor Colburn LLP

(57) ABSTRACT

Disclosed is a compressor discharge can including a transition piece and a flow redirector located about the transition piece, defining an airflow space therebetween, the flow redirector configured to reduce recirculation of flow in the airflow space.

20 Claims, 5 Drawing Sheets

METHOD AND APPARATUS FOR COOLING A TRANSITION PIECE

BACKGROUND OF THE INVENTION

The subject matter disclosed herein relates to aerodynamic improvements to the flow in a compressor discharge casing. More particularly the subject invention relates to the cooling of a transition piece of the combustor.

In many gas turbine systems, a relatively high frequency interval of inspection, maintenance and components replacement is driven by components that are exposed to the severe conditions of the hot gas path. This path includes a combustor and components downstream thereof such as nozzles, liners, and transition pieces. A transition piece is a duct component that transfers hot combusted airflow from the combustion chamber to the turbine through a compressor discharge can. Cool compressor discharge air enters the compressor discharge can and naturally flows across the transition piece, thereby cooling the transition piece, on its way from the compressor to the combustor. Sufficient cooling of the transition piece reduces inspection, maintenance and component replacement costs by increasing the life of the transition piece. Thus, improved cooling of the transition piece would be well received in the art.

BRIEF DESCRIPTION OF THE INVENTION

According to one aspect of the invention, a compressor discharge can includes a transition piece and a flow redirector located about the transition piece, defining an airflow space therebetween, the flow redirector configured to reduce recirculation of flow in the airflow space.

According to another aspect of the invention, a compressor discharge can includes a transition piece and a flow redirector located about the transition piece, an airflow space being located between the flow redirector and the transition piece, the flow redirector configured to reduce recirculation of flow in the airflow space.

According to yet another aspect of the invention, a method for cooling a transition piece includes increasing velocity of a fluid flowing across a surface of a transition piece with a flow redirector and reducing the recirculation of flow of the fluid across the surface of the transition piece with the flow redirector.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

A detailed description of the hereinafter described embodiments of the disclosed apparatus and method are presented herein by way of exemplification and not limitation with reference to the Figures.

Figure 1:
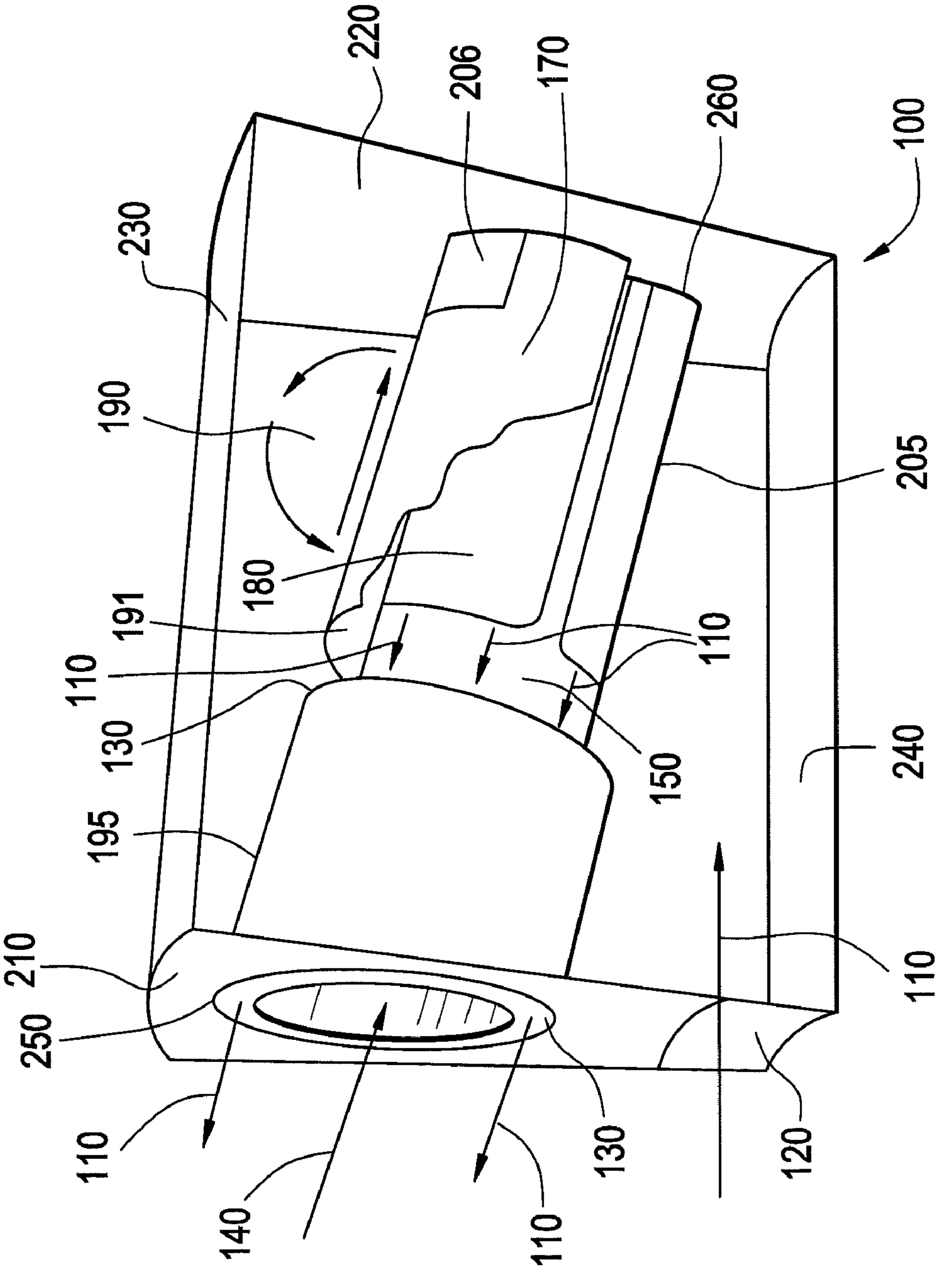
FIG. 1 depicts a perspective cutaway view of a compressor discharge can according to an embodiment of the present invention.
Figure 2:
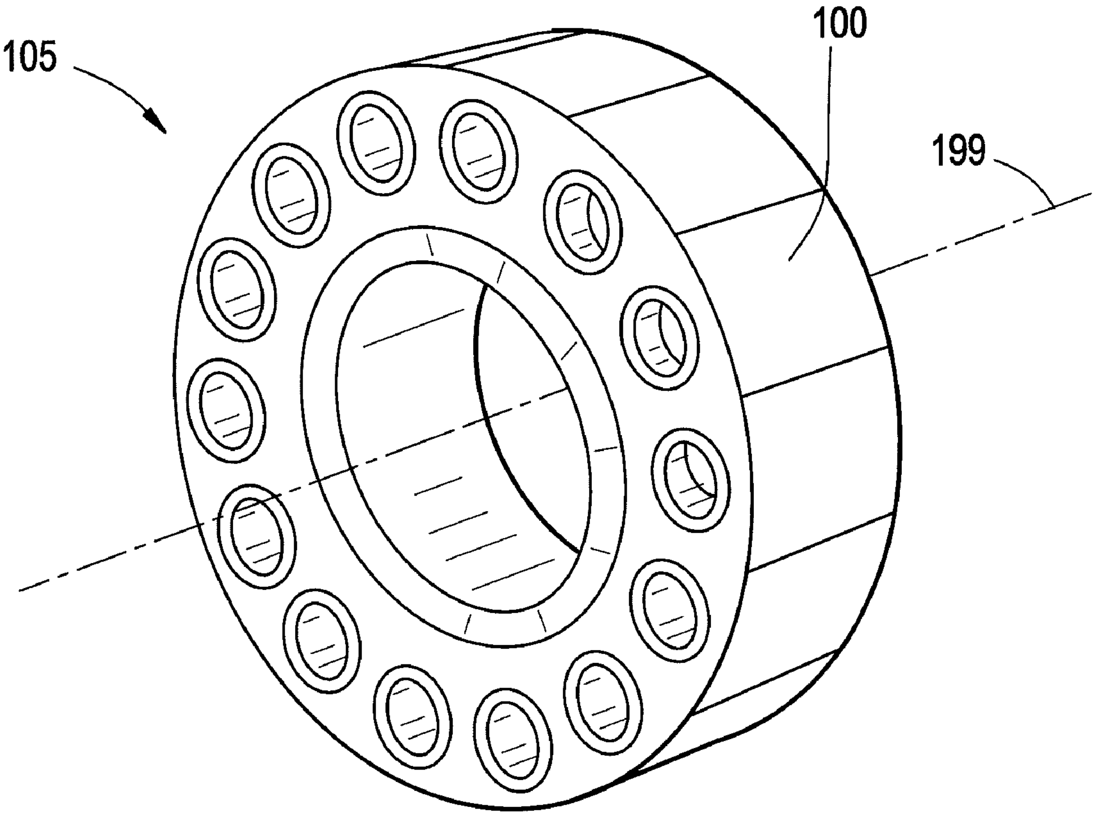
FIG. 2 depicts a perspective view of a plurality of the compressor discharge cans of FIG. 1 comprising a compressor discharge casing.

FIG. 1 shows a perspective cutaway view of a compressor discharge can 100 according to one embodiment of the present invention. A typical gas turbine has a plurality of these compressor discharge cans 100 which make up a fully annular compressor discharge casing 105, as shown in FIG. 2. The compressor discharge can 100 accepts compressor discharge airflow 110 through an airflow inlet 120. The airflow 110 naturally disperses throughout the compressor discharge can 100. The airflow 110 exits the compressor discharge can 100 through an airflow outlet 130 on its way to a combustor (not shown). The combustor combusts the airflow 110, and expels a hot combusted airflow 140 into a transition piece 150. The transition piece 150 is located within the compressor discharge can 100, and is configured to duct the hot combusted airflow 140 through the compressor discharge can 100 to a turbine (not shown). The combusted airflow 140 heats the walls of the transition piece 150 from within while the cooler compressor discharge airflow 110 cools the transition piece 150 from the outside. A flow redirector 170 is configured to redirect the airflow 110 within the compressor discharge can 100. The flow redirector 170 increases a velocity of the airflow 110 across a surface 180 of the outer wall of the transition piece 150 in comparison to what the velocity of the airflow 110 would be across the surface 180 were the flow redirector 170 not present. The increased velocity of the airflow 110 across the surface 180 reduces temperatures on the surface 180 by increasing the heat transfer between the surface and the airflow 110.

Additionally, the flow redirector 170 is configured to reduce recirculation of the airflow 110 across the surface 180 of the transition piece 150. In another embodiment, the flow redirector 170 is configured to increase the average flow velocity across the surface 180 about which the flow redirector 170 is located. The flow redirector 170 further includes a surface facing the transition piece 150 and an antipodal surface facing away from the transition piece 150. The flow redirector 170 is configured to move a recirculation zone 190 from a position adjacent to the surface 180 to a position adjacent the antipodal surface of the flow redirector 170. In this position, the recirculation zone 190 may not reduce heat transfer between the transition piece 150 and the airflow 110 because it is not in contact with the transition piece 150. In another embodiment, the flow redirector 170 is configured to reduce a flow velocity gradient of the airflow 110 across the outer wall of the transition piece 150.

In one embodiment, the flow redirector 170 is located about the surface 180. An airflow space 191 is located adjacent to the surface 180 between the flow redirector 170 and the transition piece 150. In one embodiment, an offset dimension between the flow redirector 170 and the transition piece 150 is substantially constant. Alternately, the offset dimension may vary. The flow redirector 170 is shown located radially outwardly of the transition piece 150 relative to an axis of the turbine 199, shown in FIG. 2. However, the flow redirector 170 may be located at any position about the transition piece 150 and may extend up to 360 degrees around the transition piece 150. In one embodiment, the average flow velocity in the airflow space 191 may be greater than the average flow velocity across an antipodal surface 205 located diametrically opposite to the airflow space 191 of the transition piece 150.

The flow redirector 170 is shown having a shape that is contoured around the outer wall of the transition piece 150. In this embodiment, the flow redirector 170 may have a substantially similar shape as the transition piece 150 about which it is be located. In yet another embodiment, the flow redirector 170 includes at least one opening 206 through which some flow may naturally enter.

The flow redirector 170 is attachable to the compressor discharge can 100 in one embodiment. In this embodiment, the flow redirector 170 is attachable to a turbine side can wall 220 of the compressor discharge can 100. The flow redirector 170 may be welded, screwed, adhesively applied, or attached by any other attachment means. Additionally, the compressor discharge can 100 may designedly include the flow redirector 170 attached to an inner wall of the compressor discharge can 100 during the manufacture of the compressor discharge can 100. In other embodiments, the flow redirector 170 is attached to more than one wall of the compressor discharge can 100.

Figure 3:
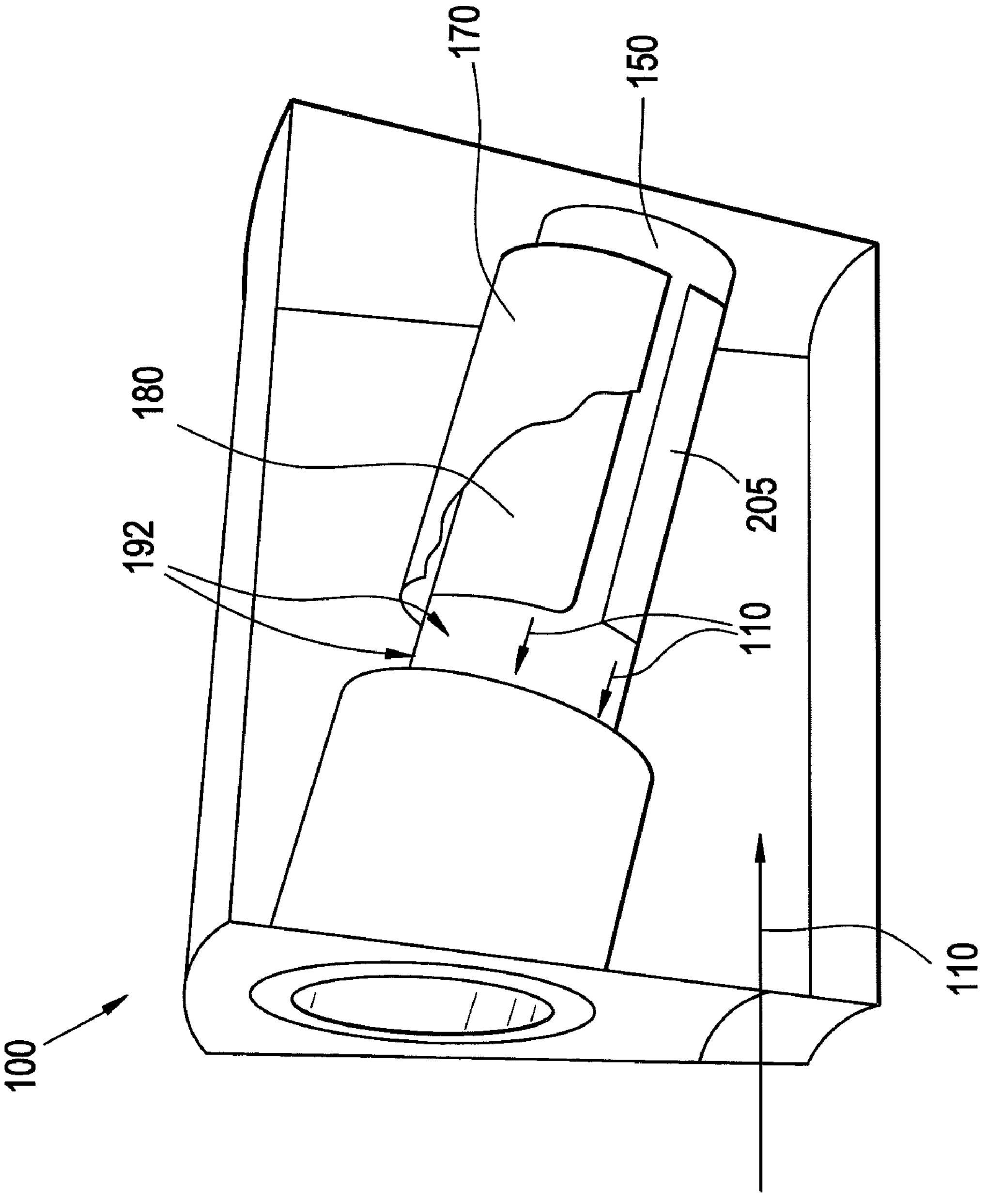
FIG. 3 depicts a perspective cutaway view of a compressor discharge can according to another embodiment of the present invention.

In another embodiment shown in FIG. 3, rather than being attached to the compressor discharge can 100, the flow redirector 170 is attachable to the outer wall of the transition piece 150. In this embodiment, the flow redirector 170 is attached to the transition piece 150 via any other means that allows airflow to reach the outer surface of the transition piece 150. For example, one or more stanchions 192 may be connected to the outer wall of the transition piece 150 and the flow redirector 170. The one or more stanchions 192 hold the flow redirector 170 away from the transition piece 150, and also allow airflow to reach the outer surface of the transition piece 150. In another embodiment, the transition piece 150 designedly includes the flow redirector 170 attached during the manufacture of the transition piece 150.

Figure 4:
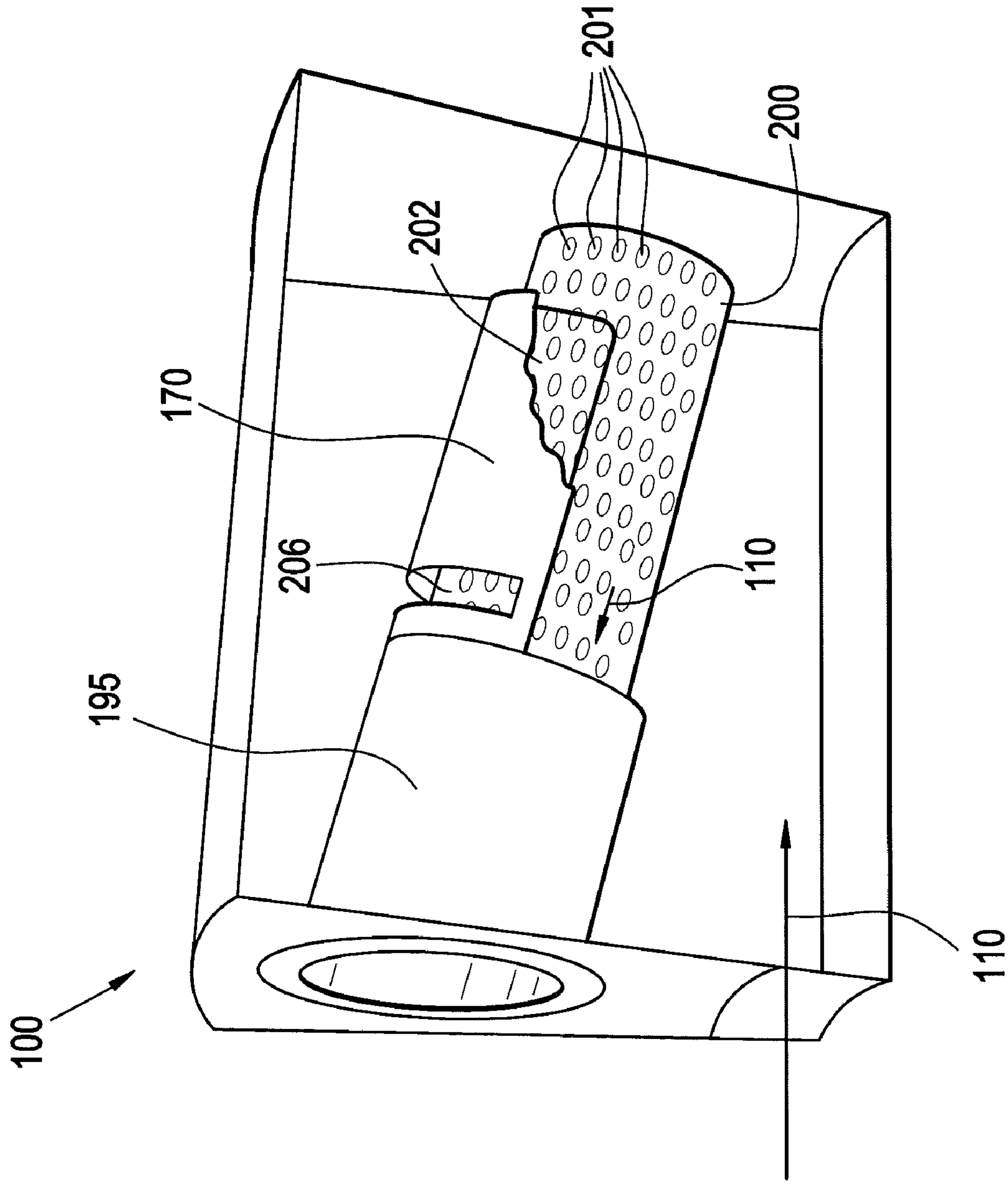
FIG. 4 depicts a perspective cutaway view of a compressor discharge can according to yet another embodiment of the present invention.

In a further embodiment, shown in FIG. 4, the flow redirector 170 is attachable to a sleeve 195 of the airflow outlet 130. The flow redirector 170 may again be welded, screwed, adhesively applied, or attached by any other attachment means to the sleeve 195. Alternately, the flow redirector 170 may be a partial extension of the sleeve 195 about the transition piece 150.

In alternate embodiments, also depicted in FIG. 4, an impingement sleeve 200 is located between the transition piece 150 and the flow redirector 170. The impingement sleeve 200 has a plurality of holes 201. The impingement sleeve 200 surrounds the transition piece 150 and aids in impingement cooling of the transition piece 150. In this embodiment, the flow redirector 170 increases the velocity of the airflow across a surface 202 of the impingement sleeve 200. This increased velocity is provided in a similar manner to the way the velocity across the surface 180 of the transition piece 150 is increased by the flow redirector 170 in embodiments without the impingement sleeve 200. The flow redirector 170 is also attachable to the impingement sleeve 200 of the transition piece 150.

Figure 5:
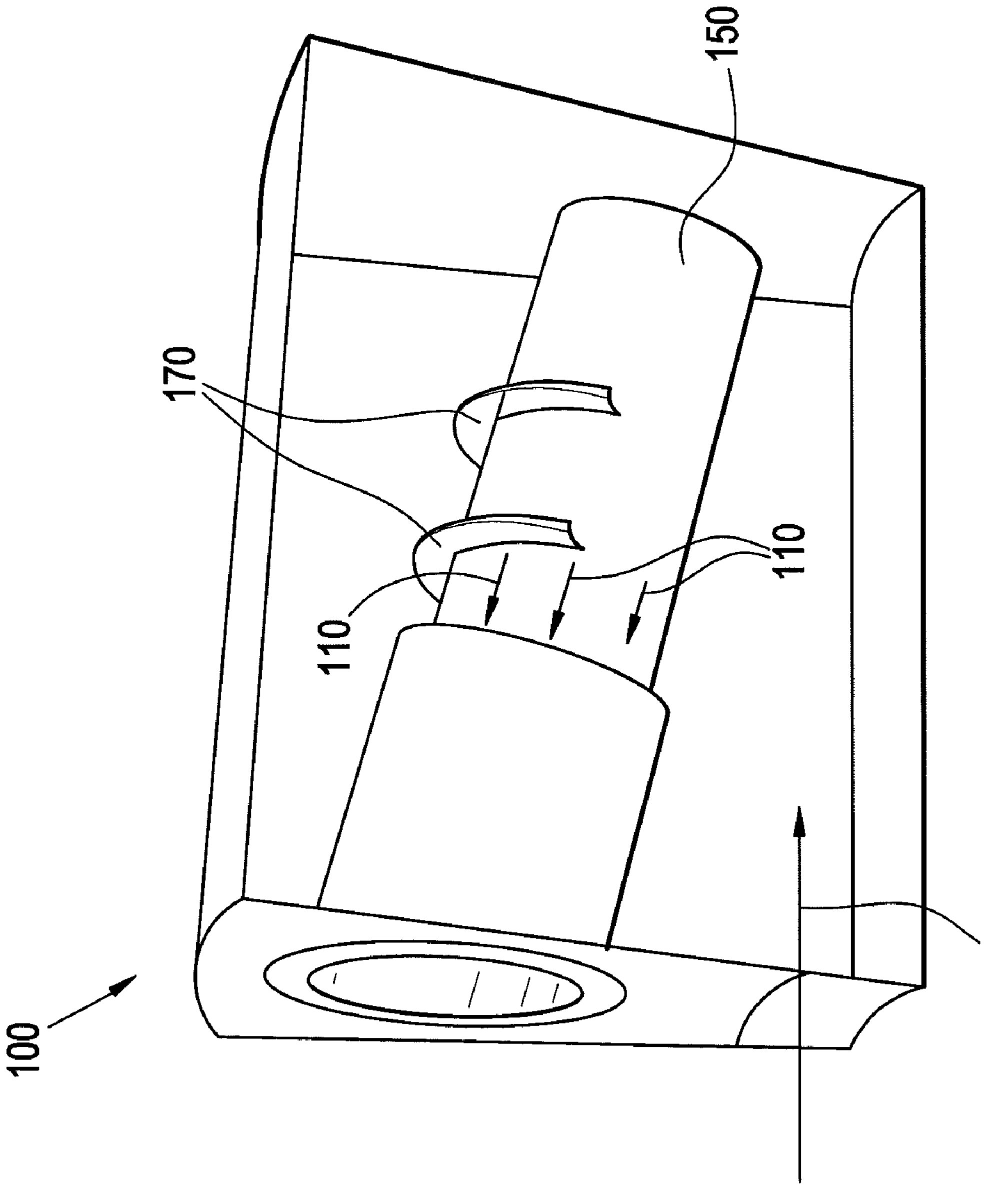
FIG. 5 depicts a perspective cutaway view of a compressor discharge can according to still another embodiment of the present invention.

It is also contemplated that an embodiment of the present invention includes a plurality of the flow redirectors 170 to redirect the flow in the compressor discharge can 100, as shown in FIG. 5. The flow redirectors 170 in this embodiment are shown to be two pieces of sheet metal, inclined (0 to 180 degrees) to an axis of the transition piece 150, with alternate numbers of sheet metal be optional. Alternately the flow redirectors 170 could have a semi-annular scoop shape having a curved profile. Further, as shown, each of the flow redirectors 170 is attached to the transition piece 150; however, in alternate embodiments at least one of the plurality of flow redirectors 170 can also be attached to the impingement sleeve 200.

In one embodiment, the flow redirector 170 is made of a metallic material including both ferrous metals such as carbon steel or stainless steel, and nonferrous metals such as copper, aluminum, titanium and magnesium. Alternately, the flow redirector 170 is a non-metallic material or any other material that is configurable to efficiently redirect airflow within the compressor discharge can 100. The flow redirector 170 may also be made of a combination of any of the above materials.

Referring back to FIG. 1, the compressor discharge can 100 further includes a combustor side can wall 210 and a turbine side can wall 220, an outer can wall 230 and an inner can wall 240. The combustor side can wall 210 has an outlet opening 250. The outlet opening 250 is formed to only allow airflow to escape the compressor discharge can 100 via outlet 130. The combustor portion (not shown) of the turbine is located proximal to the combustor side can wall 210. The turbine side can wall 220 has a transition piece opening 260. The transition piece opening 260 is sealed to the turbine side can wall 220 so as not to allow airflow to escape therebetween. The turbine side can wall 220 is located proximal to a combustor portion (not shown).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claims is:

1. A compressor discharge can comprising:

a transition piece; and a flow redirector located about the transition piece defining an airflow space therebetween, the flow redirector configured to reduce recirculation of flow in the airflow space.

2. The compressor discharge can of claim 1, wherein an impingement sleeve is located between the transition piece and the flow redirector.

3. The compressor discharge can of claim 2, wherein the flow redirector is attached to the impingement sleeve.

4. The compressor discharge can of claim 1, wherein an offset dimension is consistent between the transition piece and a proximal surface of the flow redirector.

5. The compressor discharge can of claim 1, wherein the flow redirector is located radially outwardly relative to the transition piece with respect to an axis of a combustor.

6. The compressor discharge can of claim 1, wherein the flow redirector is configured to increase flow velocity in the airflow space.

7. The compressor discharge can of claim 1, wherein flow in the airflow space flows across a surface of the transition piece, wherein an average flow velocity across the surface is greater than an average flow velocity across an antipodal surface of the transition piece.

8. The compressor discharge can of claim 1, wherein the flow redirector includes at least one opening.

9. The compressor discharge can of claim 1, wherein the flow redirector is attached to a wall of the compressor discharge can.

10. The compressor discharge can of claim 1, wherein the flow redirector is attached to the transition piece.

11. The compressor discharge can of claim 1, wherein the flow redirector is attached to a sleeve of an airflow outlet.

12. The compressor discharge can of claim 1, where the flow redirector is positioned about a hot zone of the transition piece.

13. A compressor discharge can comprising:

a transition piece; and a flow redirector located about the transition piece, an airflow space being located between the flow redirector and the transition piece, the flow redirector configured to increase flow velocity in the airflow space.

14. The compressor discharge can of claim 13, further comprising an impingement sleeve located between the transition piece and the flow redirector.

15. The compressor discharge can of claim 14, wherein the flow redirector is attached to the impingement sleeve.

16. The compressor discharge can of claim 13, wherein the flow redirector is attached to a wall of the compressor discharge can.

17. A method for cooling a transition piece comprising:

increasing velocity of a fluid flowing across a surface of a transition piece with a flow redirector; and reducing recirculation of flow of the fluid across the surface of the transition piece with the flow redirector.

18. The method for cooling a transition piece of claim 17, further comprising moving a recirculation zone to a position adjacent to an antipodal surface of the flow redirector, the antipodal surface being antipodal to a surface facing the transition piece.

19. The method for cooling a transition piece of claim 17, further comprising increasing heat transfer from the surface of the transition piece to fluid flowing thereover.

20. The method for cooling a transition piece of claim 17, further comprising reducing a flow velocity gradient of the fluid flowing adjacent an outer wall of the transition piece.

* * * * *